United States Patent

[11] 3,619,077

| [72] | Inventors | George J. Wile<br>Hamilton, Ohio;<br>Herbert Garten, Swampscott, Mass. |
|---|---|---|
| [21] | Appl. No. | 584,056 |
| [22] | Filed | Sept. 30, 1966 |
| [45] | Patented | Nov. 9, 1971 |
| [73] | Assignee | General Electric Company<br>Continuation of application Ser. No.<br>334,524, Dec. 30, 1963, now abandoned. |

[54] HIGH-TEMPERATURE AIRFOIL
11 Claims, 7 Drawing Figs.

[52] U.S. Cl.................................................. 415/115,
415/214, 415/BL, 416/97, 416/229, 416/241
[51] Int. Cl....................................................F01d 25/12,
F01d 5/18

[50] Field of Search.......................................... 253/77, 77
ML, 39.15, 39.15 B, 39.1; 75/208

[56] References Cited
UNITED STATES PATENTS

| 2,853,271 | 9/1958 | Findley........................ | 416/90 |
|---|---|---|---|
| 2,946,681 | 7/1960 | Probst et al.................. | 75/208 |
| 3,163,397 | 12/1964 | Glassmann et al............ | 415/216 |
| 3,301,526 | 1/1967 | Chamberlain................ | 415/15 |

*Primary Examiner*—Samuel W. Engle
*Attorneys*—Derek P. Lawrence, Frank L. Neuhauser, Oscar B. Waddell, Melvin M. Goldenberg, Erwin F. Berrier, Jr. and Lee H. Sacks ABSTRACT: A turbomachinery airfoil includes a plurality of stacked wafer elements which form at least a portion of the outer airfoil surface and are adapted to receive cooling fluid from a main support member.

PATENTED NOV 9 1971 3,619,077
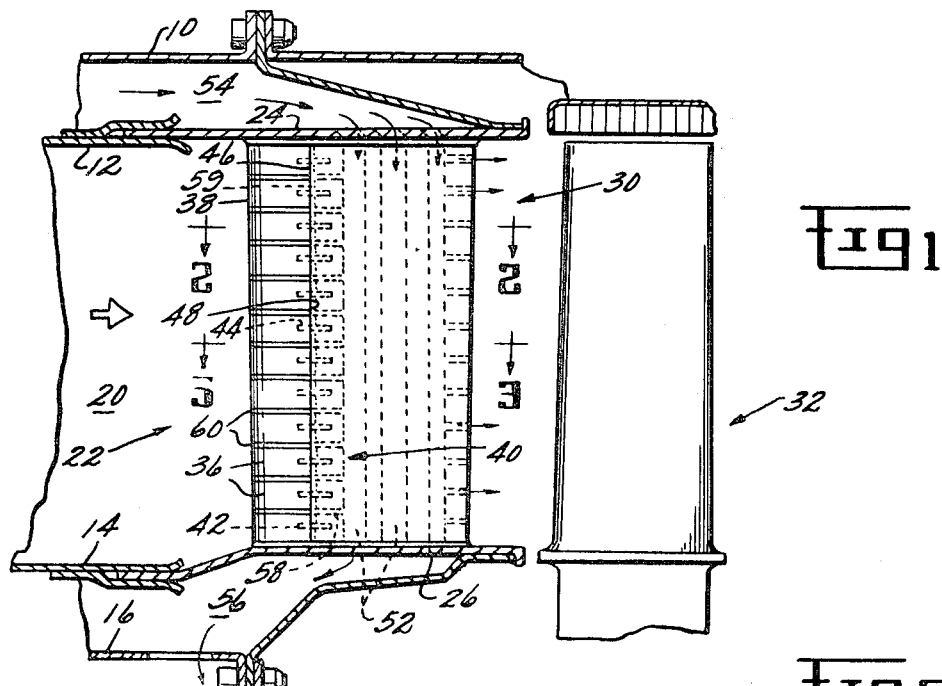
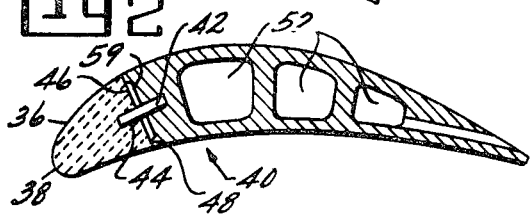
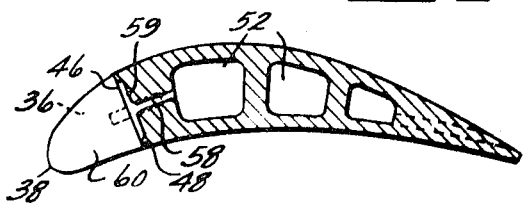
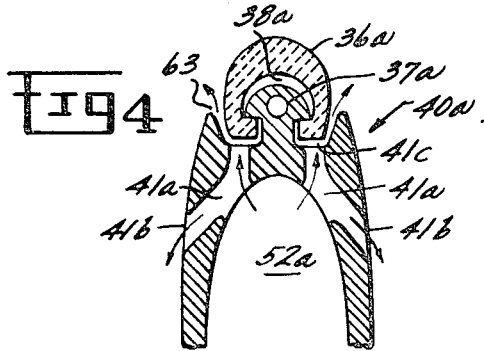
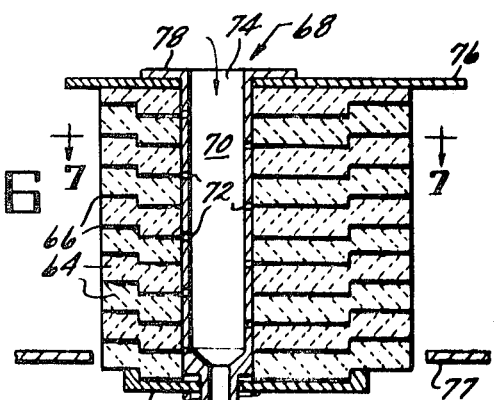
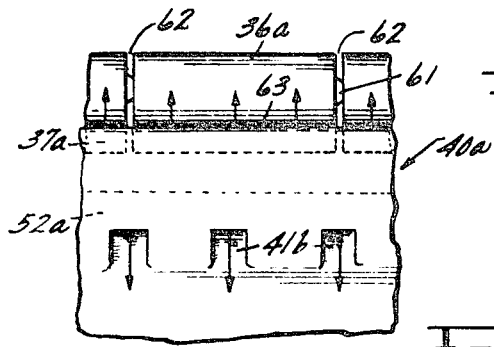
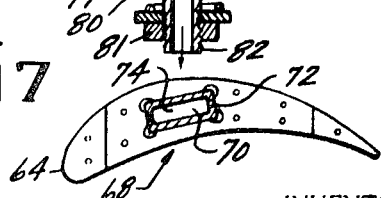
INVENTOR
GEORGE J. WILL
HERBERT GARTEN
BY
Harry C. Burgess
ATTORNEY

HIGH-TEMPERATURE AIRFOIL

This is a continuation of copending application Ser. No. 334,524, filed Dec. 30, 1963, assigned to the assignee of this application and now abandoned. This invention relates generally to gas turbomachinery airfoil construction and, more specifically to an improved blade or vane construction embodying a main structural supporting member and airfoil-shaped elements, the member and the elements being comprised of dissimilar materials cooperatively arranged for the reduction of thermally caused stresses and the enhancement of airfoil strength and durability characteristics in a high-temperature environment.

One well-known type of gas turbine is a "turbojet," wherein air compressed in a rotating compressor and heated in a combustion chamber is expanded through a turbine in which no excess power (above that required to drive the compressor) is supplied by the turbine. To increase the available energy in the turbojet cycle and, hence, the thrust and efficiency of the engine, designers have conventionally attempted to increase the turbine inlet temperature, since useful turbine engine power is directly related to turbine inlet temperature, as is turbine engine efficiency. One method, therefore, of providing more efficient turbojet operation, i.e., higher cycle temperatures and hence higher thrust values for a given size engine, is the use of more sophisticated and advanced turbine airfoil cooling techniques to permit higher turbine inlet temperatures. With these techniques, turbine nozzle (vane) and rotor blade temperatures may be brought within the capability of existent heat or oxidation resistant materials (metals). Lacking the complete availability of such cooling methods or techniques, however, recourse is made to improved blade or vane materials and construction methods.

It is known, for example, that ceramic materials have the ability to withstand significantly higher temperatures than the known refractory alloys when used in the conventional blade or vane designs, even when the latter are intensely cooled. In particular, the use of ceramic material would appear to be indicated at the leading edge of the turbine airfoil where the temperatures are always highest and where cooling is most difficult since the heat input is highest here also. It will be understood that the term "ceramic" as herein used includes composites of nonmetallics and metallics, the latter sometimes being referred to as ceramics. Examples of the latter materials which have been evaluated and been found to perform well in the practice of the present invention include: (1) chromium and 30 weight percent MgO, or Cr30MgO, and (2) $Al_2O_3$.

Ceramic materials present certain an problems however, which have heretofore made their widespread use for constructing part or all of the blade or vane prohibitive. Firstly, ceramic materials do not have the tensile strength of metallic materials. Secondly, due to its usually relatively low ductility, ceramic material has a tendency to crack under the impact of severe or suddenly applied thermal shock or stresses such as may occur in advanced lightweight aircraft gas turbines. Thirdly, where it is desired to strengthen the blade or vane structurally, such as by means of metallic body or strut member or members, the dissimilar characteristics of the metal body and the ceramic materials in the areas of ductility, thermal conductivity and brittleness, for example, create additional problems concerning how to mate these materials in an integral airfoil construction.

Accordingly, it is a general object of the present invention to provide an improved, high temperature airfoil construction utilizing dissimilar materials cooperatively and unconventionally arranged so as to reduce thermally caused stresses and enhance the airfoil strength and durability characteristics A more specific object of the invention is to provide a gas turbomachinery air foil construction utilizing ceramic material wherein normally high stresses or thermal shocks induced by sudden application of high temperature are reduced and the possibility of ceramic cracking significantly lessened.

A still further object of the present invention is to provide a gas turbomachinery airfoil construction utilizing both ceramic and metallic materials cooperatively arranged and air cooled so as to minimize the impact of the hot gas stream on the ceramic material, particularly at the ceramic-to-metal joint.

Briefly, in a disclosed embodiment of our invention we provide a gas turbomachinery turbine nozzle vane construction including a hollow main body portion of metallic, relatively ductile material, and a plurality of waferlike elements or segments mechanically and individually attached to the main body portion and forming at least the leading edge, or nose of the vane. The waferlike elements are composed of a ceramic material and are arranged in a superimposed relationship with respect to each other substantially radially to the gas turbomachine axis. Coolant is ducted through the hollow body portion and into small transverse passages leading to the ceramic-to-metal body interface. Additionally, means in the form of air-cooled shims or ductile distance pieces are provided between the segments or wafers to impose a compressive stress thereon and reduce wear, the shims and the wafers having a relative insolubility with respect to each other at high temperatures.

It is believed that many of the other advantages and benefits to be derived from use of our invention will become more apparent as the following detailed description is read in conjunction with the appended claims hereto and the following drawings in which:

FIG. 1 is a side view of a gas turbomachine turbine nozzle or diaphragm having a plurality of stator vanes, or partitions one of which is shown, radially arranged about the machine axis in the path of the main hot gas stream and incorporating our invention;

FIG. 2 is a view along line 2 of FIG. 1;

FIG. 3 is a view along line 3 of FIG. 1;

FIG. 4 is a partial, cross-sectional view of an alternate means of attaching of wafers or segments, according to our invention;

FIG. 5 is a partial, cross-sectional view of an alternative wager cooling and spacing means, according to our invention;

FIG. 6 is another embodiment of our invention incorporated in a gas turbomachine turbine nozzle vane; and FIG. 7 is a view along line 7 of FIG. 6;

While we have disclosed the invention as utilized in the construction of a lightweight (aircraft) gas turbomachine of the turbojet variety it will be appreciated that the invention may be equally used to advantage in other bladed components of this and other types of turbomachinery wherein a high-temperature environment is present.

Turning now specifically to FIG. 1, shown is a portion of the turbine section of a typical engine. Thus, an outer casing member 10, an outer liner member 12, an inner liner member 14 and an inner casing member 16 are provided. The outer and inner liner members form an annular combustor (not shown) discharge passage of turbine nozzle inlet area, indicated generally at 20. The large arrow depicts the direction of the main flow of hot combustion gas as it enters the turbine nozzle or diaphragm indicated generally at 22. The turbine nozzle comprises an outer annular band 24, an inner annular band 26 and a plurality of radially extending nozzle stator vanes, or partitions, and of which is indicated generally at 30. After the hot gas flow is turned in the proper direction by the nozzle vanes it impinges upon a rotating turbine rotor wheel, indicated generally at 32, where the necessary energy is extracted, as hereinabove explained.

Turning now to one feature of our invention, in the embodiment shown in FIGS. 1-3 it is proposed that the leading edge portion of the vane 30 be constructed of a nonmetallic or a ceramic material of the type herein described arranged in an unconventional manner. Specifically, the leading edge is comprised of a plurality of ceramic, waferlike, and are segments 36. It will be noted that the segments or elements are relatively small, compared to the overall size of the airfoil, are flat or waferlike, and are arranged or stacked radially with respect tot the turbomachine axis. The outer peripheral surface 38 of each segment conforms to the airfoil configuration of the leading edge portion of the vane and when superimposed one upon the other the segments form a more or less solid nose portion of the vane. The segments are preferably individually attached by mechanical means to a main body portion, indicated at 40, also of general airfoil configuration. In the embodiment disclosed in FIGS. 1–3 the attachment consists of a pin 42, one end of which is securely embedded in a segment, the other end protruding longitudinally therefrom to engage the body portion 40, the latter being the main supporting structure in the airfoil or vane 30. The pins may be cast integrally with the metallic body portion or may be force fitted into holes, such as openings 44 drilled or otherwise formed in the forward face 46 of the body portion and the rearward face 48 of the element or wafer 36. Alternatively, the mechanical attachment means may comprise a dovetail or insert arrangement, such as shown in FIG. 4. In the latter arrangement the ceramic nose segments or wafers 36a have a somewhat horseshoelike configuration in cross section the "arms" of the wafers being closely engaged with a forward central portion 37a of the main body portion indicated generally at 40a located in a cavity 38a in a segment. In this embodiment the forward part of the main body portion is provided with additional transverse cooling passages 41a in flow communication with a central longitudinal passage 52a. Each transverse passage 41a discharges both at 41b, at the exterior surface of the airfoil—to provide a cooling film, and at 41c, at a segment to body portion interface, to provide the composite vane construction with additional cooling to enhance strength and durability, as hereinafter more fully described. In any event, the ceramic segments are otherwise unattached either to each other along their abutting top and bottom surfaces or to the main support structure 40, and at their rear faces 48 which abut the forward face 46 of the main body portion of the vane.

Means for minimizing the impact of thermal shock in our novel vane construction will also be provided, which additionally strengthens the vane structurally and acts to increase its durability. For example, cooling air is introduced in the vane at the juncture or interface of the ceramic segments and the main body portion. Preferably the coolant is provided at the point of mechanical attachment of the main supporting structure of the vane and elements, i.e., at the location of the pins 42 of FIG. 2, since at this point a stress concentration will occur and the mechanical loading on the elements will be most severe. Also, it will be possible with the disclosed embodiments to cushion the segmented leading edge from the physical impact of the hot gas flow during sudden surges. Thus, as shown in FIGS. 1–3 a hollow or cavity 52 extending longitudinally of the main body portion 40 of the vane is provided, the cavity being supplied with cooling fluid (e.g., air) from passages 54 or 56 formed by the casing and liner members. A plurality of smaller, transverse passages 58 lead from the cavity 52 toward the leading or forward edge 46 of the body portion. A scooped out chamber or plenum 59 may be provided in the body face 46 (or alternatively in the rear face 48 of each segment) to bathe the interface and the attaching means—and the points of attachment—with coolant. Similarly, the configuration of FIG. 4 provides means to bathe the interface and means, i.e., the wafer or segment horseshoelike projections and the forward portion 37a of the main body 40a, with coolant. The air or coolant thus provided can reduce the temperature and thus enhance the strength and durability of the attachment means.

Another feature of our invention is the provision for further means to increase the wear resistance of the segments and to reduce the effects of thermal shock or stresses caused by sudden temperature changes at the nozzle inlet. Minimization of the impact due to such sudden temperature changes. e.g., by reason of engine acceleration, may be accomplished in the disclosed embodiment by the use of a plurality shim members or distance pieces 60 inserted above the stacked ceramic segments or wafer elements 36. These thin, flat shim members provide wear resistance by being constructed of a dissimilar material than the segments i.e., a material which has relatively little solid solubility tendency with respect to the ceramic at high temperatures. Thus, in a high-temperature environment the shim members act to prevent a tendency for localized welding of the otherwise abutting segments 36. Additionally, the shims can be utilized to place a compressive load on the segments in a direction parallel to the longitudinal axis of the airfoil, i.e., radially with respect to the engine axis. The relatively soft (ductile) shim or spacer members act to minimize impact forces of the hot gas stream due to the inherent compressive stress imposed on the separated assembled segments through use of the shims. Naturally, the outer and inner band members 24 and 26, respectively, are rigidized to resist movement or growth of the vane radially and to retain the compressive force. On the other hand, as shown in FIG. 5 the wafer spacing means may consist of projections or bumps 61 raised on the top or bottom surfaces of the wafers to provide a gap 62. The gaps will contain a "cushion" of cooling air and combustion gases which escape from the leading edge at a controlled rate, to be swept back along the airfoil or vane and, thus provide additional film cooling protection to the vane embodiments of either FIG. 1–3 or FIG. 4. Additionally, coolant passages 63 may be provided adjacent the ceramic-to-main body interface.

Use is therefore made of dissimilar materials in the airfoil construction disclosed herein, particularly in the leading edge of the turbine nozzle vanes, in a manner such as to reduce the normally high streses—due to sudden thermal shock—present in conventional composite construction. Thus, segmenting or cutting the relatively brittle ceramic into the waferlike elements can reduce the temperature gradient parallel to the leading edge which results in lower tensile strains and less tendency towards cracking in spite of the inherent low ductility of the ceramic. Also, since the wafers are relatively free to elongate in all directions in the high-temperature environment with the disclosed construction an additional freedom of deformation is available to reduce thermally induced stress and enchance dimensional compatibility with the metallic main body portion. The shim members and the applied compressive stress, together with cooling of the mechanical interlocked body and segment construction, further combine to enhance the strength characteristics of the high-temperature airfoil of the invention.

FIGS 6 and 7 on the other hand, indicate that in certain applications it may be possible to construct almost the entire airfoil of highly heat resistant ceramic material, e.g., silicon nitride for applications where the temperatures are so high that no metallic material may be allowed to contact the gas stream or where a corrosive atmosphere prevents the use of metallic material, or, alternatively, aluminum oxide or other porous ceramic oxides or nitrides. Thus, as shown in the drawings, a plurality of thin, hollow wafers 64 separated by shim members 66 may be mechanically interlocked with a central strut, indicated generally at 68 which serves as the primary structural element of the vane of this latter embodiment. The strut 68 will include a central cooling air passageway 70 having transverse passages 72 leading therefrom to a plenum 74 at the strut-to-wafer stack interface similar to the arrangement of the FIG. 1–3 embodiment. The nozzle diaphragm structure preferably includes inner and outer band portions 76 and 77, respectively, with airfoil shaped cutouts, the strut 68 having flange portions 78–79, to apply a compressive stress to the ceramic segments 64. Additionally, an adjustable spring 80 and clamping nut 81, engaged with a threaded portion 82 of the strut may be provided to adjust the compressive stress on the wafer stack. The shims 66 may be replaced by bumps, such as those shown in FIG. 5, in the latter embodiment.

It will be understood that such other embodiments or obvious changes that are within the spirit and scope of the invention, as disclosed herein, are intended also to be covered by the claims appended thereto.

We claim:

1. For use in high-temperature turbomachines, an airfoil comprising:

main support means including longitudinally spaced-apart end members and means interconnecting said end members, said interconnecting means having at least one supply passage therein extending between said end members for the flow of cooling fluid, a plurality of wafer elements, in longitudinally stacked relationship disposed in compression between said end members, said wafer elements forming at least a portion of the outer surface of said airfoil and having greater resistance than said main support means to corrosion and high temperatures, and a plurality of passages in said interconnecting means joining said supply passage and said wafer elements so as to direct cooling fluid to said wafer elements.

2. An airfoil as defined by claim 1 in which said wafer elements are formed of a ceramic material 3. An airfoil as defined by claim 2 including spacing means between adjacent ceramic wafer elements.

4. An airfoil as defined by claim 3 in which said spacing means is of a different material than said ceramic wafer elements, said spacing means and said ceramic wafer elements having relative insolubility with respect to each other at high temperatures.

5. An airfoil as defined by claim 3 in which said spacing means permit flow of cooling fluid between adjacent ceramic wafer elements so as to provide enhanced resistance to high temperatures.

6. An airfoil as defined by claim 3 in which said interconnecting means of said main support means includes means biasing said end member toward each other so as to thereby apply compressive force to said ceramic wafer elements and said spacing means interposed therebetween.

7. An airfoil as defined by claim 3 in which said interconnecting means and said end members of said main support means are rigidly joined to form a substantially integral structure.

8. An airfoil as defined by claim 7 in which each of said ceramic wafer elements is mechanically attached to said interconnecting means.

9. An airfoil as defined by claim 8 in which said mechanical attachment means comprises a pin connection.

10. A high-temperature gas turbomachine airfoil including:

a main body portion comprised of a solely metallic, relatively ductile material, said main body portion having passages therein for coolant flow, a plurality of wafer elements, said elements being composed of a material having higher temperature and corrosion resistant properties than that of said main body portion said elements being superimposed one upon another and arranged radially with respect to the turbomachine axis, said wafer elements forming at least the leading edge portion of the airfoil contour, means mechanically attaching said wafer elements so said main body portion including a transverse projection of said body portion into a cavity centrally of each element, said projection being retained therein, there being clearance passages between the walls of the said cavity and said projection at least partially of the transverse extension thereof, said clearance passages receiving coolant flow from said main body passages, and means interposed between adjacent wafer elements and providing a compressive stress thereon, said interposed means and said elements having relative insolubility one with respect to the other at high temperatures.

11. A high-temperature gas turbomachine airfoil as described in claim 10 wherein said interposed means radially spacing said elements comprise a plurality of raised portions on one of the abutting faces of each pair of adjacent elements in the stack of elements.

* * * * *